No. 717,591. PATENTED JAN. 6, 1903.
J. A. MELL.
NUT LOCK.
APPLICATION FILED MAY 21, 1902.
NO MODEL.
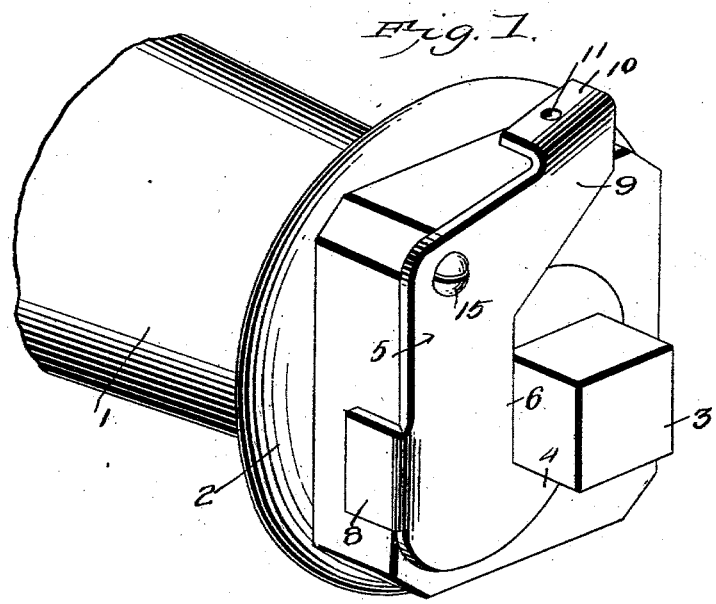
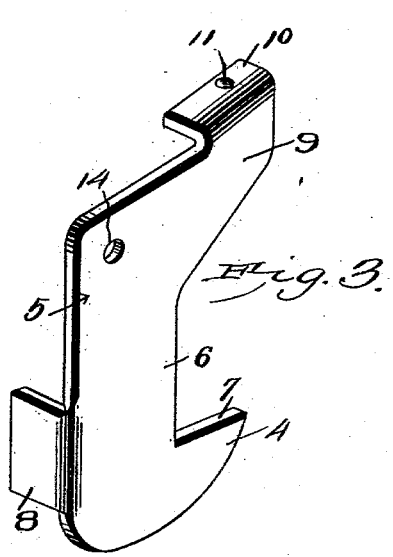
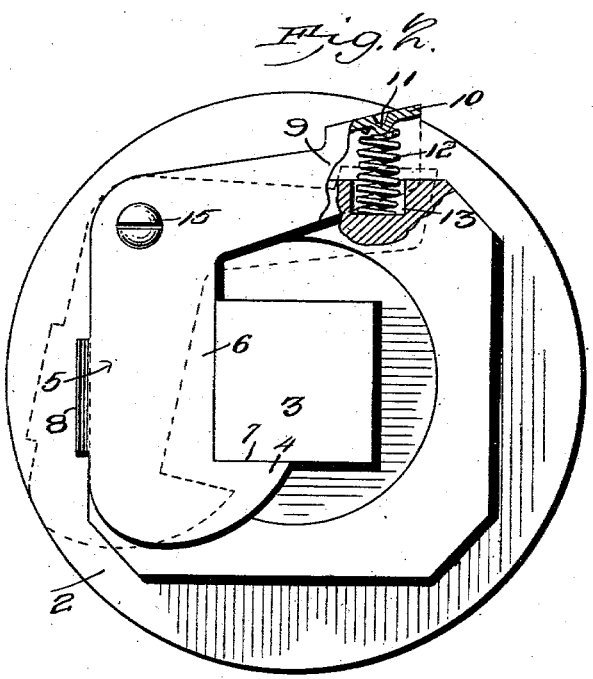
Witnesses
James A. Mell, Inventor
by C. A. Snow & Co.
Attorneys

UNITED STATES PATENT OFFICE.

JAMES A. MELL, OF MOLINE, MICHIGAN, ASSIGNOR OF ONE-HALF TO JOHN G. HEINZMANN, OF MOLINE, MICHIGAN.

NUT-LOCK.

SPECIFICATION forming part of Letters Patent No. 717,591, dated January 6, 1903.

Application filed May 21, 1902. Serial No. 108,399. (No model.)

*To all whom it may concern:*

Be it known that I, JAMES A. MELL, a citizen of the United States, residing at Moline, in the county of Allegan and State of Michigan, have invented a new and useful Nut-Lock, of which the following is a specification.

This invention relates to nut-locks.

The object of the invention is to provide a nut-lock adapted more particularly for securing a wagon-axle nut on the axle, the device in its application requiring no peculiar kind of nut nor, to effect its application with a nut already in use, any change in its contour or structural arrangement other than the provision of a threaded opening for a screw to hold the device in position and of a well for holding in position an actuating-spring.

While the device is shown as applied to the nut of a wagon-axle, it is to be understood that the invention is not to be limited to this particular application, as it is adaptable for use for holding nuts locked upon bolts of railway-rail joints or in any other position where its use would be advantageous.

With the above-stated and other objects in view, as will appear as the nature of the invention is better understood, the same consists in the novel construction and combination of parts of a nut-lock, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in perspective, exhibiting the nut of a wagon-axle provided with the device of the present invention. Fig. 2 is a view in end elevation, partly in section. Fig. 3 is a perspective detached detail view of a nut-lock.

Referring to the drawings, 1 designates the spindle of an ordinary axle, and 2 the nut carried by the outer threaded portion thereof, the terminal of the spindle being formed into a rectangular extension 3 to be engaged by the locking member 4 of the nut-lock, (designated generally 5.)

The nut-lock is by preference constructed of a piece of sheet metal of the desired thickness and comprises a body portion 6, near one terminal of which is arranged the locking member 4, the same comprising an arm having a straight upper face 7 to engage with the extension 3, as clearly shown in Fig. 2. The body portion is provided adjacent to the locking member, but on the side opposite thereto, with a stop 8, which is disposed at right angles to the body in order to lie against one of the faces of the nut, as clearly shown in Fig. 1, thus to limit inward movement of the locking member for the purpose that will presently appear. Projecting substantially at right angles from the terminal of the body opposite that carrying the locking member is a releasing member 9, comprising an arm having the upper side of its terminal portion bent at right angles to its length to present a combined finger-piece and spring-retainer 10, the spring-retainer comprising a pin or projection 11, extending downward from the under side of the finger-piece and into the upper whirls of a coiled spring 12, the lower portion of which is housed in a well 13, formed in one of the faces of the nut. As herein shown, the projection 11 is formed by punching downward a teat from the finger-piece, the object of this arrangement being that all of the parts of the nut-lock will be integral; but it will be obvious that, if preferred, a pin may be associated with the finger-piece and still be within the scope of the invention. The body is provided at the angle where it merges into the releasing member with an opening 14, adapted to be engaged by a screw 15, engaging a threaded opening (not shown) in the nut. Thus the only change requisite in the construction of the nut to adapt it to receive the nut-lock of the present invention will be the provision of a threaded opening for the screw 15 and a well or depression 13 to receive the actuating-spring 12.

When it is desired to remove the nut from the axle, a wrench is applied to the releasing member and to the side of the nut parallel therewith, thereby throwing the locking member to the position shown in dotted lines in Fig. 2, whereby it will be freed from the extension 3 and leave the nut free to be turned.

When the locking member is in engagement with the extension 3, as shown in Figs. 1 and 2, the nut will be positively locked against separation from the spindle, as from jars or vibrations incident to the passage of a vehicle over roadways. By reason of the simplicity of the device and the readiness with which it may be applied to nuts already in use it will recommend itself particularly to farmers and those living in rural districts, where the loss of an axle-nut aside from damage to the vehicle or injury to occupants that might ensue is a serious matter.

The stop 8 by limiting the inward movement of the locking member prevents loss of the spring 12, which would ensue if the body were allowed to swing freely across the axle-opening of the nut, and it is therefore of importance in a structure such as that characterized by the present invention.

Having thus fully described my invention, what I claim as new, and desire to secure by Letters Patent, is—

1. The combination with a nut and a spindle having an extension projecting beyond the face of the nut, of a nut-lock pivotally associated with the face of the nut and provided with a locking member to bear against a side of the extension, and means for holding the locking member in positive engagement with the extension.

2. The combination with a nut and a spindle having an extension projecting beyond the face of the nut, of a nut-lock pivotally connected with the outer face of the nut and provided with a locking member to bear against a side of the extension and with a stop to limit inward movement of the member, a releasing member disposed approximately at right angles to the locking member, and a spring interposed between the nut and the releasing member and operating to hold the locking member in engagement with the extension.

3. The combination with a nut, of a nut-lock pivotally connected to the outer face of the nut and movable parallel therewith, and comprising a body provided with a lateral locking member adapted to project across the spindle-opening of the nut and with a stop to engage a face of the nut to limit inward movement of the locking member, and a releasing member disposed approximately at right angles to the body and having an extension provided with a downward-extending projection, and a spring having its upper whirls engaged by the projection and its lower portion seated in a well in the nut.

4. As a new article of manufacture, a nut-lock comprising a body portion provided at one terminal with a locking member and with a stop disposed at right angles thereto, and its other terminal with an angularly-disposed arm provided at its terminal with an offset having a downward-projecting extension, the offset projecting in the same direction as the stop.

In testimony that I claim the foregoing as my own I have hereto affixed my signature in the presence of two witnesses.

JAMES A. MELL.

Witnesses:
W. F. ROSE,
FRANK H. WASHBURN.